US007992880B2

(12) United States Patent
Thomas

(10) Patent No.: US 7,992,880 B2
(45) Date of Patent: Aug. 9, 2011

(54) SHOPPING CART TRANSFORMED INTO A MOBILE DISPENSING DISPLAY DEVICE

(75) Inventor: James Paul Thomas, Pulaski, TN (US)

(73) Assignee: Pop-A-Cart LLC, Pulaski, TN (US)

( * ) Notice: Subject to any disclaimer, the term of this patent is extended or adjusted under 35 U.S.C. 154(b) by 268 days.

(21) Appl. No.: 12/425,116

(22) Filed: Apr. 16, 2009

(65) Prior Publication Data

US 2009/0289430 A1 Nov. 26, 2009

Related U.S. Application Data

(60) Provisional application No. 61/128,450, filed on May 22, 2008.

(51) Int. Cl.
*B62D 39/00* (2006.01)

(52) U.S. Cl. .................................... 280/33.992; 40/308

(58) Field of Classification Search ............. 280/33.992, 280/33.991; 40/308, 124.006, 587, 604
See application file for complete search history.

(56) References Cited

U.S. PATENT DOCUMENTS

| | | | | |
|---|---|---|---|---|
| 2,845,731 | A * | 8/1958 | Gaborsky, Jr. | 40/308 |
| 4,081,205 | A * | 3/1978 | Rosenacker | 312/249.8 |
| 4,487,134 | A | 12/1984 | Foote | |
| 4,643,280 | A * | 2/1987 | Hensley | 190/11 |
| 4,679,818 | A | 7/1987 | Kakavas | |
| 5,004,252 | A | 4/1991 | Kraper | |
| 6,944,981 | B1 * | 9/2005 | Garberg et al. | 40/308 |
| 2009/0065541 | A1 * | 3/2009 | Thomas | 224/277 |

* cited by examiner

*Primary Examiner* — J. Allen Shriver, II
*Assistant Examiner* — James Dolak

(57) ABSTRACT

A conventional shopping cart is transformed into a mobile dispensing display device for use at retail establishments, tradeshows, sporting events, or other special events by mounting a tabletop panel horizontally on top of a conventional type shopping cart. The tabletop panel is mounted in a substantially covering relationship to the handle bar, child seat backrest and open top of the shopping cart basket. A flexible banner display is removably attached to the outer periphery of the tabletop panel. The banner display being attached to the tabletop panel in a substantially covering relationship to all four sides of the shopping cart. Whereby the unseen covered shopping cart becomes a mobile promotional and sales display device providing products for sale, information, samples or coupons. Products to be sold and/or sampled, as well as coupons or other promotional materials may be placed in the shopping cart basket area or on the tabletop panel.

1 Claim, 2 Drawing Sheets

SHOPPING CART TRANSFORMED INTO A MOBILE DISPENSING DISPLAY DEVICE

STATEMENT AS TO PRIORITY

The instant application claims priority to and the benefit of U.S. Provisional Patent Application No. 61/128,450 filed May 22, 2008.

BACKGROUND OF THE INVENTION

1. Field of the Invention

The present invention relates to shopping carts and more particularly pertains to a shopping cart transformed into a mobile dispensing display device.

2. Description of the Prior Art

The use of shopping carts is known in the prior art. More specifically, shopping carts of known designs and configurations previously devised and utilized for the purpose of holding and storing purchases through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example,

U.S. Pat. No. 6,944,981 to Garberg, et al. relates to a mobile dispensing display by mounting an advertising display onto the shopping cart basket and mounting a product sample support panel on the shopping cart basket rim over the child seat.

U.S. Pat. No. 5,004,252 to Kraper discloses a shopping basket accessory includes a partition for covering a bin area of a conventional shopping cart and for providing a solid writing surface proximate the handle on a conventional shopping cart.

U.S. Pat. No. 4,679,818 to Kakavas discloses a display table attachment for shopping carts. The inventive table is configured to accommodate the front and rear configurations in such manner that the table top is level at a comfortable height and thus serves admirably for the display of samples, promotional products and the like, usually monitored by an attendant. Specifically, the table is notched, slotted, etc. at its rear to accommodate the wider and higher rail structure at the rear end of the basket and the front end of the table includes a support for elevating the table, in cooperation with the rear end configuration, so as to achieve the level status of the table.

U.S. Pat. No. 4,487,134 to Foote discloses a device for use with a shopping cart to provide a portable worktable that includes a flat table member supportable by the sides of the cart and positionable to substantially cover the open top of a shopping cart, and a plurality of legs for removably retaining the table member on the cart.

U.S. Pat. No. 4,081,205 to Rosenacker discloses a display cart assembly which is built on and supported by a shopping cart. Upright side panels are releasably supported on opposite sides of a basket of the shopping cart. Upright end panels span opposed end portions of the side panels. A container is mounted between the side panels. A chamber of the container extends into the interior of the basket and can contain ice for refrigerating food articles in the chamber.

While these devices fulfill their respective, particular objectives and requirements, the aforementioned patents do not describe a shopping cart transformed into a mobile dispensing display device by mounting a cantilevered tabletop panel over the handle bar, child seat upright backrest, and open top basket of the shopping cart and further includes at least one flexible banner display member attached to the outer periphery of the tabletop panel, the flexible banner display being attached on the tabletop panel in a substantially covering relationship to all four sides of the shopping cart.

Accordingly, there has arisen a need for an improved mobile device and method of displaying and distributing products for sale or samples and promotional items at retail establishments, tradeshows, outdoor festivals, sporting or other special events where large crowds of people congregate.

SUMMARY OF THE INVENTION

The present invention uniquely meets these requirements by providing a mobile dispensing display device which an attendant may use to circulate within certain areas at retail establishments, tradeshows, outdoor festivals, sporting or other special events where large crowds of people congregate. In addition, the invention includes a method for transforming a shopping cart into a mobile dispensing display device. The present invention has significant advantages over the prior art displays in that the attendant may transform a shopping cart easily into a mobile dispensing display device without the necessity of carrying a large display setup to retail establishments, tradeshows, outdoor festivals, sporting or other special events and may position the mobile dispensing display device at advantageous locations to be more approachable to customers because the mobile display creates an atmosphere permitting the attendant to interact with the persons attending more readily. Advertising or signage is removably attached to the tabletop panel which permits ready transformation of any shopping cart which helps to call the persons attention to the mobile dispensing display device.

The mobile dispensing display device hereof includes a shopping cart having a basket and wheels which permit easy pushing of the mobile dispensing display device through a retail establishment, tradeshow, outdoor festivals, sporting or other special events. Such shopping carts include a basket and a handle bar, and preferably a child seat with a upright backrest. The tabletop panel is a rigid planar member of a durable material such as wood, or more preferably, composite materials, and is positioned over the top of the shopping cart to rest on the uppermost portion of the upright child seat backrest and the shopping cart handle bar. The tabletop panel is removably mounted to the shopping cart handle bar with at least one coupling member. The tabletop panel includes a least one opening that is configured to allow access to the interior of the shopping cart basket by an attendant. The attendant or customers can easily reach their hand inside of the opening and remove products from the basket area. The tabletop panel is particularly useful for the attendant in displaying products for sale or samples to interested persons. The mobile dispensing display device also includes a flexible banner display which is removably attached to the tabletop panel by coupling members. The banner display may most preferably be provided as a flexible sheet of synthetic resin sheeting which is lightweight and readily attached and removed by the use of the coupling members. The method includes the steps of placing at least one receptacle within the basket, the receptacle having moisture impervious sides and bottom such as to be able to retain liquid, ice and/or the product within the receptacle.

The invention hereof also includes a method of transforming a shopping cart into a mobile dispensing display device. The method includes the steps of providing a shopping cart as described above, removably mounting a tabletop panel in a substantially horizontal orientation on the uppermost portion of the shopping cart handle bar in a substantially covering relationship to the handle bar, child seat and the open top of the shopping cart basket. The mounting step for the tabletop panel preferably includes positioning the tabletop panel so that the uppermost portion of the shopping cart handle bar and the uppermost portion of the upright child seat backrest are in contact with the lower surface of the tabletop panel. The tabletop panel is removably attached to the shopping cart handle bar by means of at least one coupling member. The method includes the steps of placing at least one receptacle within the basket, the receptacle having moisture impervious sides and bottom such as to be able to retain liquid, ice and/or the product within the receptacle.

Furthermore, the invention hereof includes a banner display. A mobile dispensing display device is preferably provided which includes at least one flexible banner display that is removably attached to the tabletop panel.

From the foregoing, it may be appreciated that the invention hereof provides a distinct advantage over static product displays or sampling displays which are relatively statically located. The attendant may actively seek out advantageous locations at special events while being able to move to new locations as a result of overcrowding or dispersion of persons. Furthermore, the mobile dispensing display device not only includes a banner display, but also facilitates display and dispensing of products for sale or samples from the tabletop panel.

These and other objects will be readily appreciated by those skilled in the art with reference to the drawings and description which follow.

DESCRIPTION OF THE PREFERRED EMBODIMENT

Figure 1:
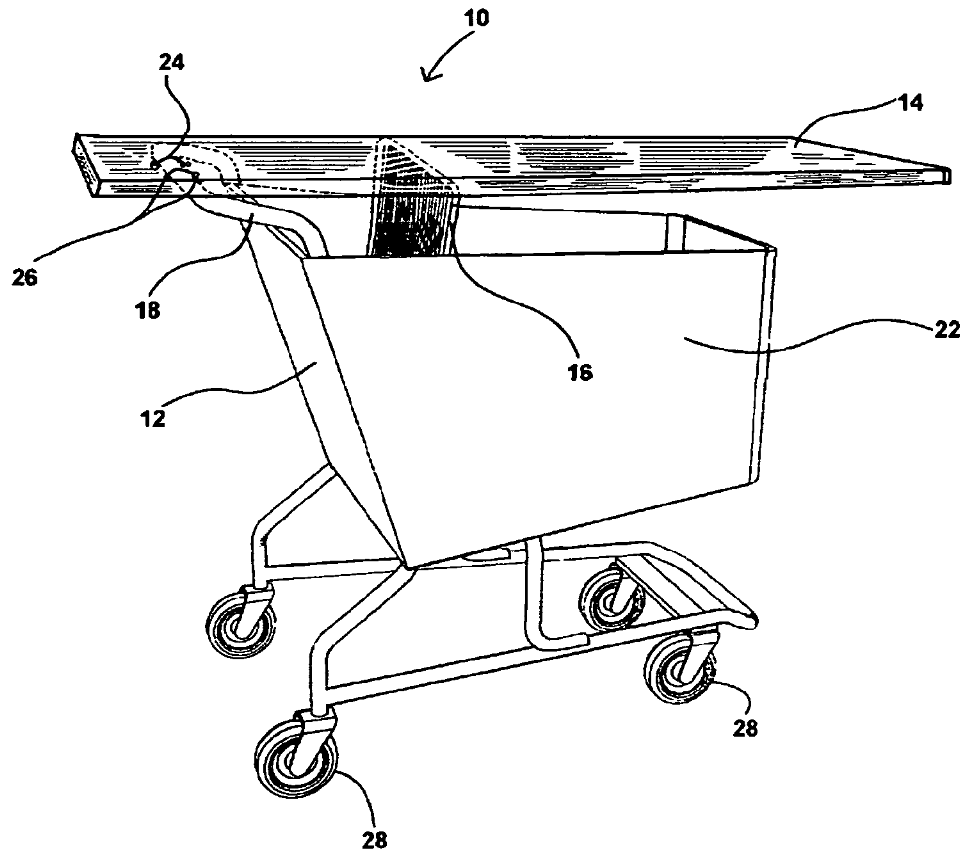
FIG. 1 is a left rear perspective view of the apparatus of the present invention, showing a shopping cart having a handle bar, a basket and a child seat upright backrest, a tabletop panel is removable attached to the uppermost portion of the shopping cart handle bar, said tabletop panel is in a substantially covering relationship to the handle bar, child seat upright backrest and the open top of the shopping cart basket.

Referring now to the drawings, a mobile dispensing display device 10 in accordance with the present invention as shown in FIG. 1 broadly includes a shopping cart 12, a tabletop panel 14 is mounted on the uppermost portion of the shopping cart 12 and positioned in a substantially horizontal orientation on the top of the shopping cart 12 such that the uppermost portion of the upright child seat backrest 16 and shopping cart handle bar 18 are in contact with the lower surface of the tabletop panel 14, said tabletop panel 14 is in a substantially covering relationship to the handle bar 18, child seat upright backrest 16 and the open top of the shopping cart basket 22. The tabletop panel 14 is removable attached to the shopping cart handle bar 18 by means of a least one coupling member 24. The tabletop panel 14 includes a least one opening 26 that is configured to allow access to the interior of the shopping cart basket 22. The mobile dispensing display device 10 can easily roll by means of a plurality of wheels assemblies 28 that are integral to the shopping cart 12.

In greater detail, the shopping cart 12 hereof may be of any one of a variety of types and styles as used by shoppers in supermarkets, such as the conventional forward cantilever nesting variety as shown in the drawing figures hereof, Such shopping carts 12 typically include a basket 22 for receiving items selected for purchase, a handle bar 18 for pushing the shopping cart 12, an upright child seat backrest 16 for permitting a small child to sit facing the handle bar 18, a plurality of wheel assemblies 28.

The foregoing description generally describes the shopping carts 12 which are entirely conventional and well known to supermarket shoppers.

Figure 2:
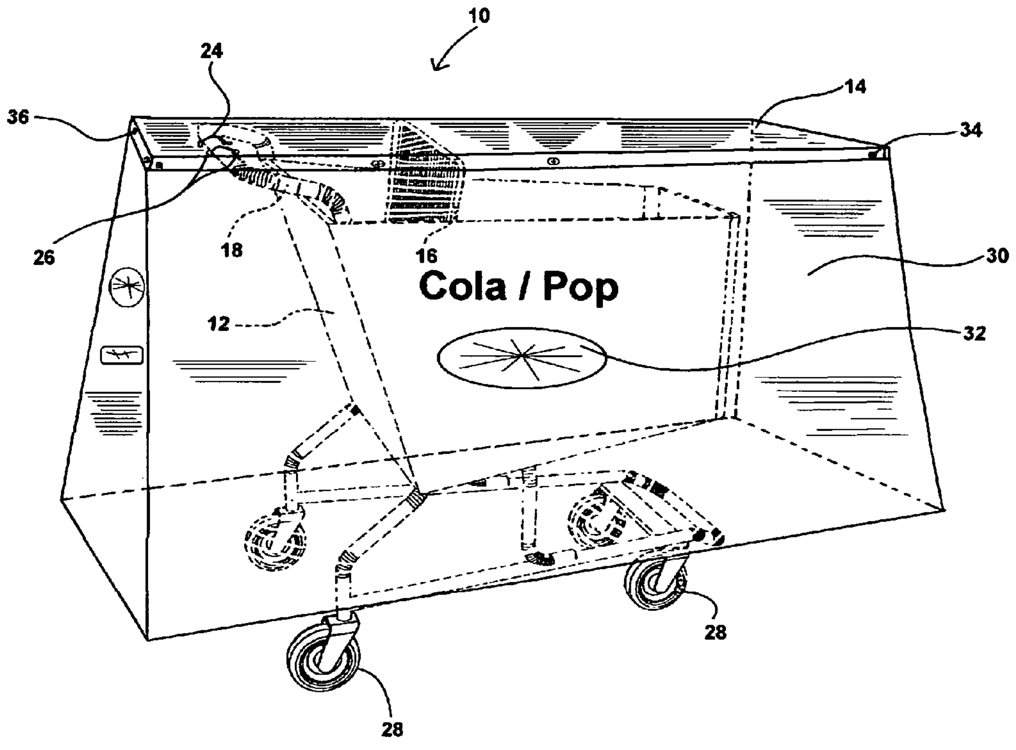
FIG. 2 is a left rear perspective view of the apparatus of the present invention wherein a flexible banner display is removably attached to the outer periphery of the tabletop panel, the flexible banner display being removably attached on the tabletop panel in a substantially covering relationship to all four sides of the shopping cart.

Referring now to FIG. 2, a mobile dispensing display device 10 in accordance with the present invention as shown in FIG. 2 broadly includes a shopping cart 12, a tabletop panel 14 mounted on the uppermost portion of the shopping cart 12, coupling members 24 for mounting the tabletop panel 14 to the shopping cart handle bar 18, the lower surface of the tabletop panel 14 is in contact with the uppermost portion of the upright child seat backrest 16 and the handle bar 18 of the shopping cart 12. The tabletop panel 14 includes a least one opening 26 that is configured to allow access to the interior of the shopping cart basket 22. The mobile dispensing display device 10 can easily roll by means of a plurality of wheels assemblies 28 that are integral to the shopping cart 12.

Such conventional shopping carts 12 may be readily transformed into the mobile dispensing display device 10 of the present invention by the use of a relatively few inexpensive additions. The flexible banner display 30 is preferably an elongated sheet of imprintable material such as paper, cloth or synthetic resin. The flexible banner display 30 includes indicia 32 printed on at least the exterior facing side thereof, the indicia 32 preferably corresponding to the product or samples to be dispensed. While the flexible banner display 30 may be of various sizes and can be provided in one, two, three or more separate sections, it is most preferably dimensioned of a length sufficient to substantially wrap around the tabletop panel 14. Further, the flexible banner display 30 is most preferably dimensioned to extend downwardly from the tabletop panel 14 to the wheel assemblies 28 to provide a more attractive appearance to the mobile dispensing display device 10 and to focus the attention of customers on the flexible banner display 30 and the products displayed on the tabletop panel 14. The flexible banner display 30 preferably includes grommets 34 or the like to facilitate attaching the banner display 30 to the outer periphery of the tabletop panel 14 with coupling members 36.

A variety of different coupling members 36 may be employed for attaching the flexible banner display 30 to the outer periphery of the tabletop panel 14, string, threaded fasteners, cable ties, and wire twist ties are lightweight, small, inexpensive and easy to use and for these reasons are among the preferred couplers. However, it may be understood that adhesive, hooks, toggles, snap loops, hook and loop fasteners, magnetic strips and many other couplers may be used to attach the flexible banner display to the tabletop panel 14.

Beneficially, the banner display 30, couplings members 24 and 36, tabletop panel 14, are both lightweight, easy to transport, and quickly mounted to a shopping cart 12 of conventional design without the necessity of tools. Thus, the transformation of the shopping cart 12 into the mobile dispensing display unit 10 can be quickly an easily accomplished by an individual without the need for tools. For example, the flexible banner display 30 may be folded until the time of use, and attached to the outer periphery of the tabletop panel 14 by string, threaded fasteners, cable ties, or wire twist ties.

Additionally, a receptacle 38 may be placed in the basket 22. Ice may be placed in the receptacle 38, and products 40 may be placed in the receptacle and maintained at a colder temperature than the ambient temperature of the environment.

Obviously, numerous variations and modifications can be made without departing from the spirit of the present invention. Therefore, it should be clearly understood that the form of the present invention described above and shown in the figures of the accompanying drawing is illustrative only and is not intended to limit the scope and spirit of the present invention as described and defined in the following claims.

What I claimed is:

1. A method of transforming a shopping cart into a mobile dispensing display device, wherein the shopping cart includes a handle bar, a basket, and a child seat supported on a plurality of wheels, said child seat including a generally upright backrest, said shopping cart transforming method comprising the steps of: (a) mounting on the uppermost portion of the shopping cart a tabletop panel with front and rear ends, said tabletop panel being cantilevered generally horizontally and removably attached to said shopping cart handle bar at the rear end, then resting on the uppermost portion of the child seat upright backrest of the shopping cart, said tabletop panel is in a complete covering relationship to the handle bar, child seat upright backrest and the open top of the shopping cart basket; said tabletop panel includes a rigid generally rectangular substantially planar member, said tabletop panel having a plurality of opposed holes being spacedly disposed along and through the rear end portion thereof, said holes are configured to receive fastening members that are removably disposed therein, (b) positioning said tabletop panel in a substantially horizontal orientation on the uppermost surfaces of the shopping cart such that the plurality of said opposed holes are positioned to straddle over the top of the shopping cart handle bar, wherein said fastening members will engage said holes and said handle bar, wherein said tabletop panel is removably attached to and in direct contact with the uppermost portion of said shopping cart handle bar, thereby completely covering said handle bar from public view and/or engagement, and (c) one continuous flexible banner display bearing indicia is removably attached to and wrapped around the outer periphery of said tabletop panel, said banner display being only attached to the outer periphery of said tabletop panel and not attached to or supported by the opposed panel walls of said shopping cart, wherein said banner display is in a complete covering relationship to all four sides of the shopping cart.

* * * * *